United States Patent
Shimizu et al.

(10) Patent No.: US 6,843,343 B2
(45) Date of Patent: Jan. 18, 2005

(54) ELECTRIC POWER STEERING DEVICE CAPABLE OF REDUCING VIBRATION OF STEERING WHEEL

(75) Inventors: Yasuo Shimizu, Wako (JP); Katsuji Watanabe, Wako (JP); Yoeru Kono, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/391,058

(22) Filed: Mar. 17, 2003

(65) Prior Publication Data

US 2003/0188917 A1 Oct. 9, 2003

(30) Foreign Application Priority Data

Apr. 4, 2002 (JP) ........................................ 2002-102223

(51) Int. Cl.[7] .................................................. B62D 5/04
(52) U.S. Cl. ..................................................... 180/444
(58) Field of Search ................................. 180/427, 444, 180/443, 445, 446

(56) References Cited

U.S. PATENT DOCUMENTS

| | | | | |
|---|---|---|---|---|
| 5,289,893 A | * | 3/1994 | Yamamoto et al. | 180/427 |
| 5,445,237 A | * | 8/1995 | Eda et al. | 180/444 |
| 6,076,417 A | * | 6/2000 | Engler | 74/388 PS |
| 6,237,713 B1 | * | 5/2001 | Onodera et al. | 180/444 |
| 2003/0178244 A1 | * | 9/2003 | Namgung | 180/443 |

FOREIGN PATENT DOCUMENTS

| | | |
|---|---|---|
| JP | 11-020717 | 1/1999 |
| JP | 2002-321632 | 11/2002 |

* cited by examiner

*Primary Examiner*—Avraham Lerner
(74) *Attorney, Agent, or Firm*—Merchant & Gould P.C.

(57) ABSTRACT

The electric power steering device such that the characteristic vibration of the rack shaft is adjusted by providing a hollow portion at the rack shaft, resulting in that the characteristic vibration of the rack shaft does not resonate with the vibration of the rack caused by the wheels and/or the motor.

9 Claims, 6 Drawing Sheets

ELECTRIC POWER STEERING DEVICE CAPABLE OF REDUCING VIBRATION OF STEERING WHEEL

FIELD OF THE INVENTION

The present invention relates to an electric power steering device that reduces a load of steering power by a driver of a vehicle such as an automobile by directly applying motor power to a steering system and particularly an electric power steering device that restricts vibration of the device.

BACKGROUND OF THE INVENTION

An electric power steering device directly uses a driving force of a motor to assist steering power of a driver of a vehicle such as an automobile. Such a vehicle to which the electric power steering device is loaded becomes widely-used. The electric power steering device makes motion of the steering wheel lighter for the driver, resulting in that it becomes lighter for the driver to operate the steering wheel without stronger power than ever.

An electric power steering device is for example represented by a pinion-assist typed electric power steering device that uses a worm shaft having a worm gear and a worm shaft as a unit that assists driving force of a motor (called "auxiliary torque") for the purpose of the above-mentioned assistance.

Figure 6:
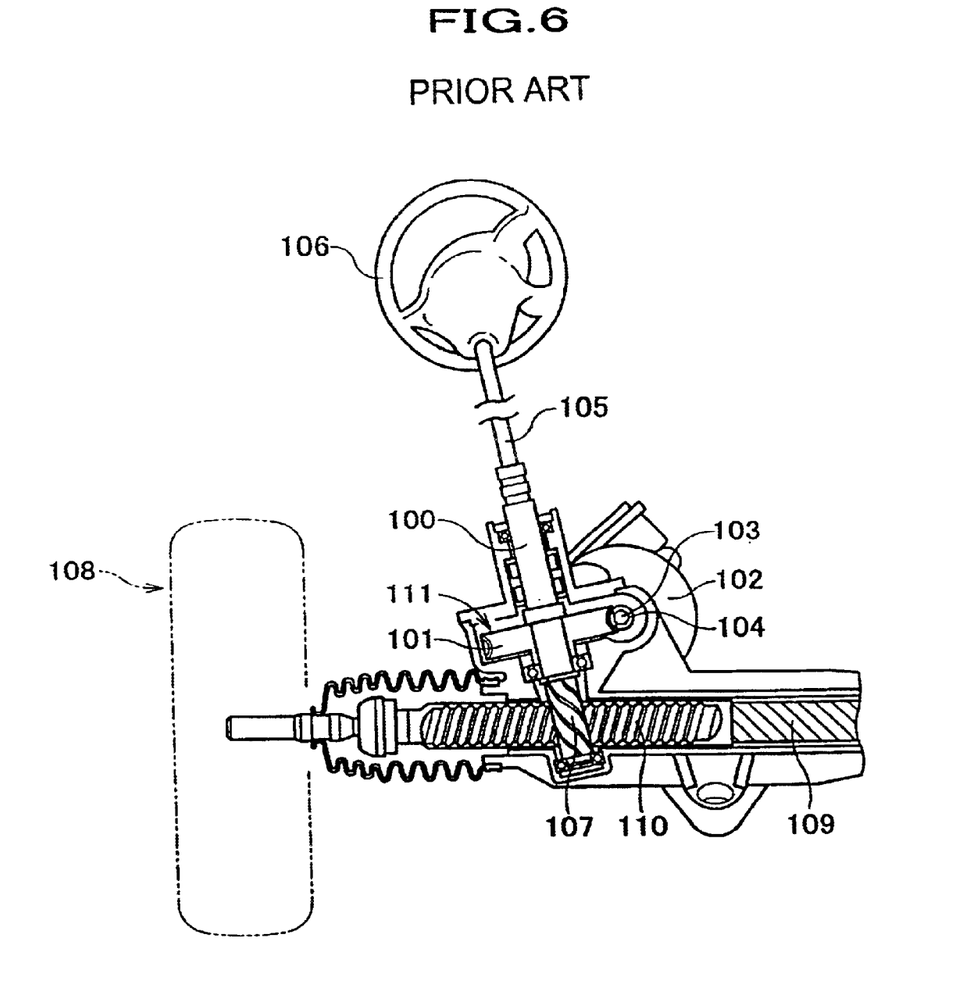
FIG. 6 is a partly sectional view of a conventional electric power steering device.

As shown in FIG. 6, such a pinion-assist typed electric power steering device includes a gear-typed decelerating mechanism provided with worm wheel 101 attached to pinion shaft 100, worm shaft 103 attached to motor 102 that has worm gear 104, and so on.

Worm shaft 103 is connected to motor 102 coaxially relative to a rotational shaft of motor 102. Worm wheel 101 mating with worm shaft 103 is arranged coaxially relative to pinion shaft 100. Pinion shaft 100 is jointed to steering shaft 105. Steering shaft 105 is fixed to steering wheel 106 operated by the driver. Pinion 107 of pinion shaft 100 mates with rack-teeth 110 of rack shaft 109 for controlling wheels of the vehicle (called "wheels 108"). The auxiliary torque applied by rotation of motor 102 is, by way of the gear-typed decelerating mechanism, transmitted to rack shaft 109 by way of a mating portion of pinion 107 with rack 110.

Thus, the auxiliary torque of the motor is applied to a steering system.

However, according to such a conventional electric power steering device, a reaction against the road on which the vehicle is running, is transmitted to rack shaft 109 by way of wheel 108, resulting in vibration. The portion of motor 102 that applies the auxiliary torque to the steering system to torque transmitting unit 111 (also called "gear-typed decelerating mechanism having worm shaft 103" attached to motor 102) becomes a generating source that causes vibration to rack shaft 109. If frequency of the vibration is consistent with frequency of the characteristic vibration of rack shaft 109, then there occurs resonance, resulting in rack shaft 109 being greatly vibrated. Further, the vibration of rack shaft 109 is transmitted from steering shaft 105 to steering wheel 106, resulting in a noise in the interior of the vehicle.

As a related art having the purpose of adjusting vibration occurring in an electric power steering device like this, e.g., there is disclosure JP11-20717A.

In this disclosure, by supporting the rack shaft at three positions in such a same way, resonance can be restricted to the vibration of the rack shaft owing to the wheels and members from the motor to the torque transmission unit. However, the supporting positions of the supporting members for supporting the rack shaft can be restricted to change to an area where the supporting positions are narrow. Thus, the resonance between the characteristic of the rack shaft and the vibration of the rack shaft caused by the members such as the wheels and the motor has not been able to be reduced, sufficiently.

SUMMARY OF THE INVENTION

It is an object of the present invention to sufficiently reduce resonance to be generated in an electric power steering device and reduce vibration of the steering wheel and noise at an interior of a vehicle such as an automobile.

According to a first aspect of the preferred embodiment of the present invention, there is provided an electric power steering device having: a pinion shaft to which a steering torque is applied; a motor that provides the auxiliary torque for assistance of the steering torque; a rack shaft having rack-teeth that mate with the pinion formed at the pinion shaft and that includes a hollow portion; wheels provided at both ends of the rack shaft and steered by converting motion of rotation of the pinion shaft to motion of displacement in a direction of the rack shaft by way of mating of the pinion with the rack-teeth; a first supporting member that supports one end of the rack shaft and that is formed by mating the rack-teeth provided at the one end with the pinion provided at the pinion shaft; a second supporting member that supports the other end of the rack shaft; and a third supporting member that supports a portion between the one end and the other end.

According to the first aspect of the present invention, formation of the hollow portion of the rack shaft reduces weight of the rack shaft, resulting in that a characteristic frequency of the rack shaft defined by $(K/M)^{1/2}$ (K; spring constant against bending of the rack shaft, M; mass of the rack shaft) becomes larger than a characteristic frequency when a hollow portion is not formed at the rack shaft. Therefore, e.g., depth of the hollow portion and diameter of section of the hollow portion is adjusted so that the weight of the rack shaft is changed, resulting in that a larger vibration can be restricted because the characteristic vibration does not resonate with vibration of the rack shaft caused by mechanism such as the wheels and the motor of a vehicle. Thereby, the larger vibration and a noise caused by the vibration can be restricted. Additionally, adjustment of the location of the hollow portion has balance of the weight of the rack shaft changed; also thereby the larger vibration and a noise caused by the vibration can be further restricted.

According to a second aspect of the preferred embodiment of the present invention, there is an electric power steering device, wherein the rack shaft includes the hollow portion formed at an end opposed to an end in which the rack-teeth are formed.

According to a third aspect of the preferred embodiment of the present invention, there is an electric power steering, wherein the rack shaft includes the hollow portion extended from an end surface of the rack shaft in a direction of axis of the rack shaft.

According to a fourth aspect of the preferred embodiment of the present invention, there is an electric power steering further having: another configuration, the rack shaft includes the hollow portion formed in a hollow-cylindrical shape and extended from an end surface of the rack shaft in a direction of axis of the rack shaft.

According to the fifth aspect of the preferred embodiment of the present invention, there is an electric power steering device according to the fourth aspect, wherein the rack shaft includes the hollow portion having a diameter which is gradually smaller from an end surface of the rack shaft in a direction of axis of the rack shaft to the other end surface.

According to the sixth aspect of the preferred embodiment of the present invention, there is an electric power steering device according to the fourth aspect, wherein a bottom of the rack shaft is formed in a substantially hollow-conical shape.

And, according to the seventh aspect of the preferred embodiment of the present invention, there is an electric power steering device wherein a bottom of the rack shaft is formed in a substantially semi-spherical shape.

Through such configurations, the hollow portion can be provided in various shapes.

BRIEF DESCRIPTION OF THE DRAWINGS

In the accompanying drawings.

and

DESCRIPTION OF THE PREFERRED EMBODIMENTS

It will be specifically explained about one preferred embodiment of the electric power steering device.

Firstly, referring to FIG. 1 and FIG. 2, it will be explained about configuration of the fist aspect of the preferred embodiment.

Figure 1:
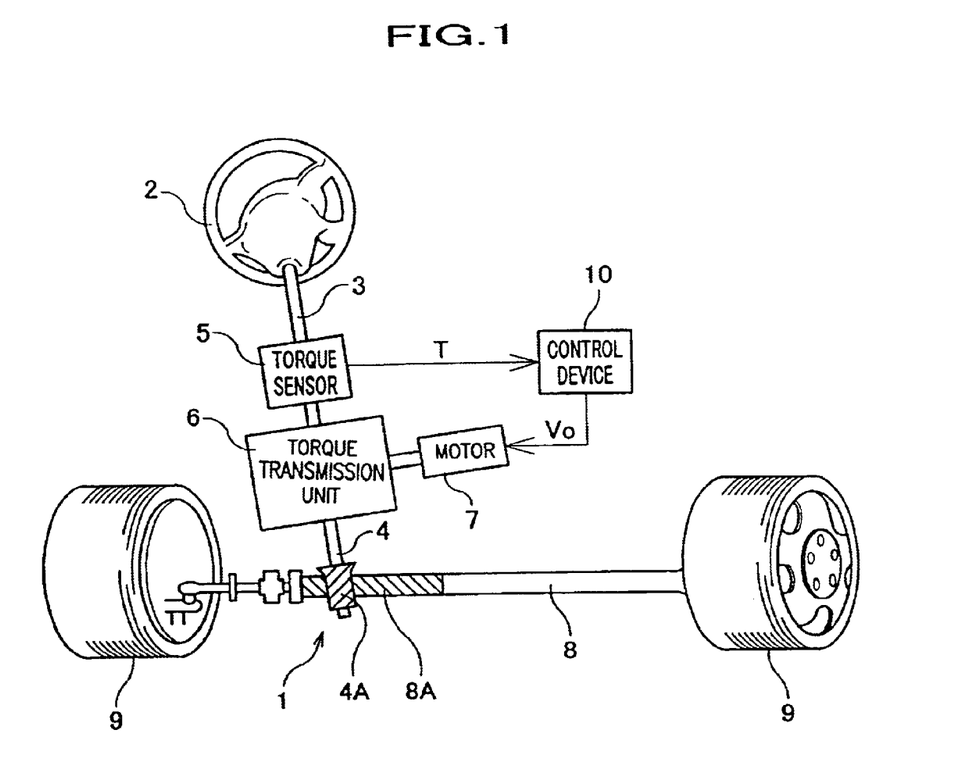
FIG. 1 is a whole configuration illustration of the electric power steering device relating to one aspect of a first embodiment.

As shown in FIG. 1, electric power steering device 1 is provided with steering wheel 2 operated by a driver of a vehicle such as an automobile. Steering wheel 2 is joined to pinion shaft 4 by way of steering shaft 3. A steering torque by operation of steering wheel 2 of the driver is applied to pinion shaft 4 by way of steering shaft 3. Pinion shaft 4 has magnetostriction-type torque sensor 5 (also merely called "torque sensor 5") and torque transmission unit 6, also referring to FIG. 2. Torque sensor 5 detects the steering torque applied to the steering system. Torque transmission unit 6 is a kind of a power-multiplying device, which is connected to motor 7 for adding an auxiliary torque to the steering system. In the aspect of the first embodiment, motor 7 is e.g. a brushless motor.

Electric power steering device 1 is a rack-and-pinion-type. Pinion 4A provided at an under portion of pinion shaft 4 is mated with rack teeth 8A formed at rack shaft 8.

Torque sensor 5 that outputs steering torque signal T is connected to control device 10.

Figure 2:
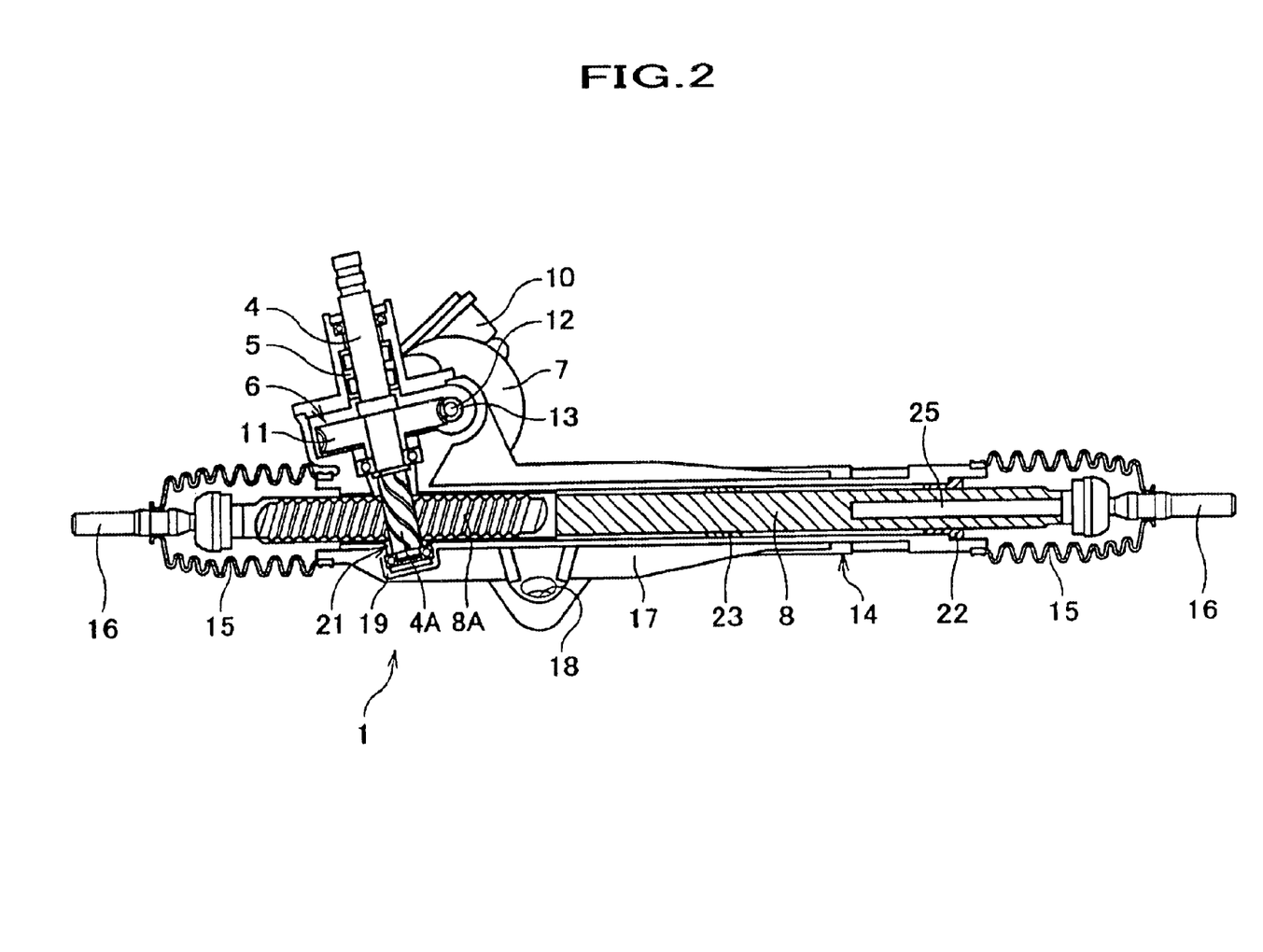
FIG. 2 is an elevation partly in section of the electric power steering device relating to one aspect of the first embodiment.

As shown in FIG. 2, torque transmission unit 6 is provided with worm wheel 11 fixed coaxially relative to pinion shaft 4. Motor 7 is joined to worm shaft 12. Worm gear 13 of worm shaft 12 is mated with worm wheel 11.

Rack shaft 8 is disposed inside of rack housing 14. Both end portions of rack housing 14 are covered with boots 15, 15, thereby protecting the inside of rack housing 14 and preventing foreign matters such as dust from invading into the inside thereof. Each of tie rods 16, 16 is connected to each of both end portions of rack shaft 8, which are connected to wheels 9,9 (refer to FIG. 1) by way of unshown knuckle joints.

Rib 17 used for reinforcement of rack shaft 8 is formed at an outside of rack housing 14. Bending rigidity is enhanced in a bending direction of rack housing 14. Attaching portion 18 for attaching rack housing 14 to an unshown body of the vehicle is formed at a portion being intermediate but somewhat formed nearer a selected one of both ends beneath rack housing 14.

First supporting member 21, second supporting member 22, and third supporting member 23 that support rack shaft 8 are disposed at the inside of rack housing 14. First supporting member 21 is for supporting one end of rack shaft 8, which is constituted by mating of pinion 4A formed under an end of pinion shaft 4, with rack teeth 8A formed at rack shaft 8. Rack guide 19 which presses rack shaft 8 from backward toward pinion 4A, is formed lying at a back side of rack teeth 8A.

Second supporting member 22 is constituted using a supporting bearing provided at the other side of rack shaft 8, which slidably supports the other end of rack shaft 8. Third supporting member 23 is constituted using a supporting bearing disposed between one end and the other end (i.e., at an intermediate portion) of rack shaft 8, which slidably supports an intermediate portion between one end and the other end of rack shaft 8.

Figure 4A:
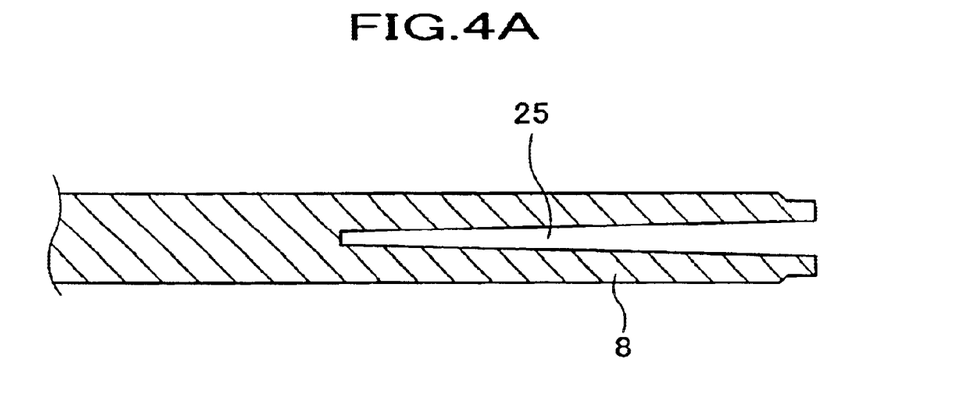
FIG. 4A is a partly sectional view in one of three shapes of the hollow portion of the rack shaft of the electric power steering.
Figure 4B:
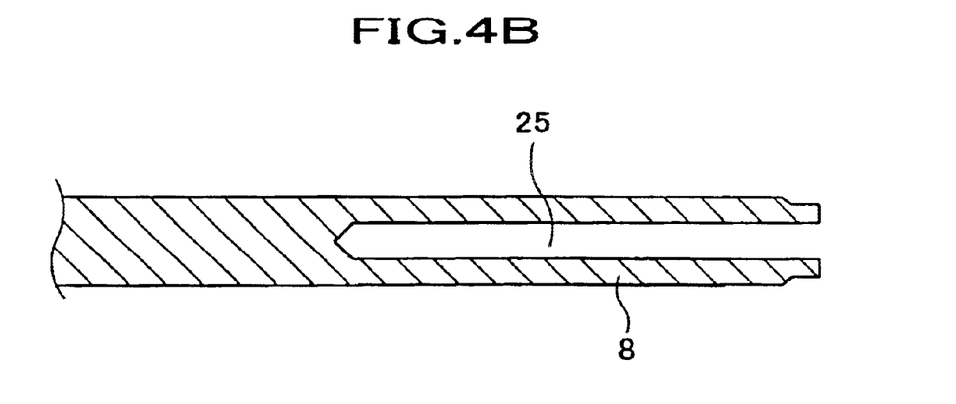
FIG. 4B is a partly sectional view in one of three forming shapes of the hollow portion of the rack shaft of the electric power steering.
Figure 4C:
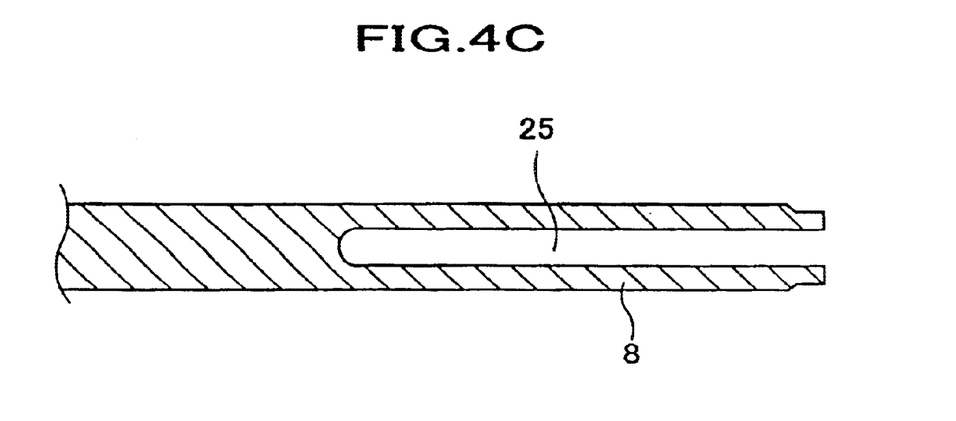
FIG. 4C is a partly sectional view in one of three forming shapes of the hollow portion of the rack shaft of the electric power steering.

Hollow portion 25 is formed in such a way that a predetermined depth is provided for hollow portion 25 by hollowing out an end portion surface opposite to the end portion surface at the side where rack teeth 8A are formed, for example by using a working tool such as a spinning drill or the like. Hollow portion 25 may be also formed in a die-cast manner. Hollow portion 25 is formed thereby e.g., in such a way that an inner diameter of the hollow portion is substantially equal over the entire portion. Further, as shown in FIG. 4A, the diameter toward the end portion at which rack teeth 8A are formed, gradually becomes larger while the diameter toward the other end portion gradually becomes smaller. Note that a predetermined depth of hollow portion 25 is properly determined so that the resonance does not occur. Also, note that a predetermined location of hollow portion 25 is properly determined in a same way. Further, as shown in FIG. 4B and FIG. 4C, a bottom hollow portion 25 is formed in a substantially hollow-conical shaping manner or in a substantially semi-spherical shaping manner.

Rigidity is required for a portion where rack teeth 8A of rack shaft 8 is formed, resulting in that the portion is formed as a solid portion. On the other hand, such rigidity relative to the above-mentioned rigidity is not required for a portion at the opposite side where rack teeth 8A of rack shaft 8 are formed, resulting in that the portion thereat is formed using hollow portion 25. Thus, rigidity over an entire portion of rack shaft 8 can be maintained while weight thereover can be reduced. Additionally, weight of rack shaft 8 can be readily adjusted depending on the depth of hollow portion 25 and/or the diameter of section of hollow portion 25 in such a way that resonance does not occur.

Secondly, referring to FIG. 1 and FIG. 2, it will be specifically explained about operations of the aspect of the first embodiment of the electric power steering, with effects obtained using the operations.

The driver can operate steering wheel 2 relative to ratating wheels 9, 9 so that motion of rotation of pinion shaft 4 is converted into motion of displacement in a direction of axis of rack shaft 8.

Torque sensor 5 detects steering power by the driver and outputs steering torque signal T to control device 10. Control device 10 calculates the auxiliary torque based on at least steering torque signal T outputted from torque sensor 5 and thereafter outputs motor voltage Vo according to the auxiliary torque, to motor 7.

Motor 7 receives motor voltage Vo and supplies the auxiliary torque to the steering system. More specifically, if a rotating shaft of motor 7 is rotated in order to supply the auxiliary torque to the steering system, the auxiliary torque is transmitted to pinion shaft 4 by way of torque transmission unit 6. The auxiliary torque transmitted to pinion shaft 4 is transmitted to rack teeth 8A of rack shaft 8 by way of pinion 4A. Additionally, steering power is also transmitted to pinion shaft 4. The steering power is obtained by operation of the driver's steering wheel 2 and further transmitted to rack teeth 8A.

Figure 3:
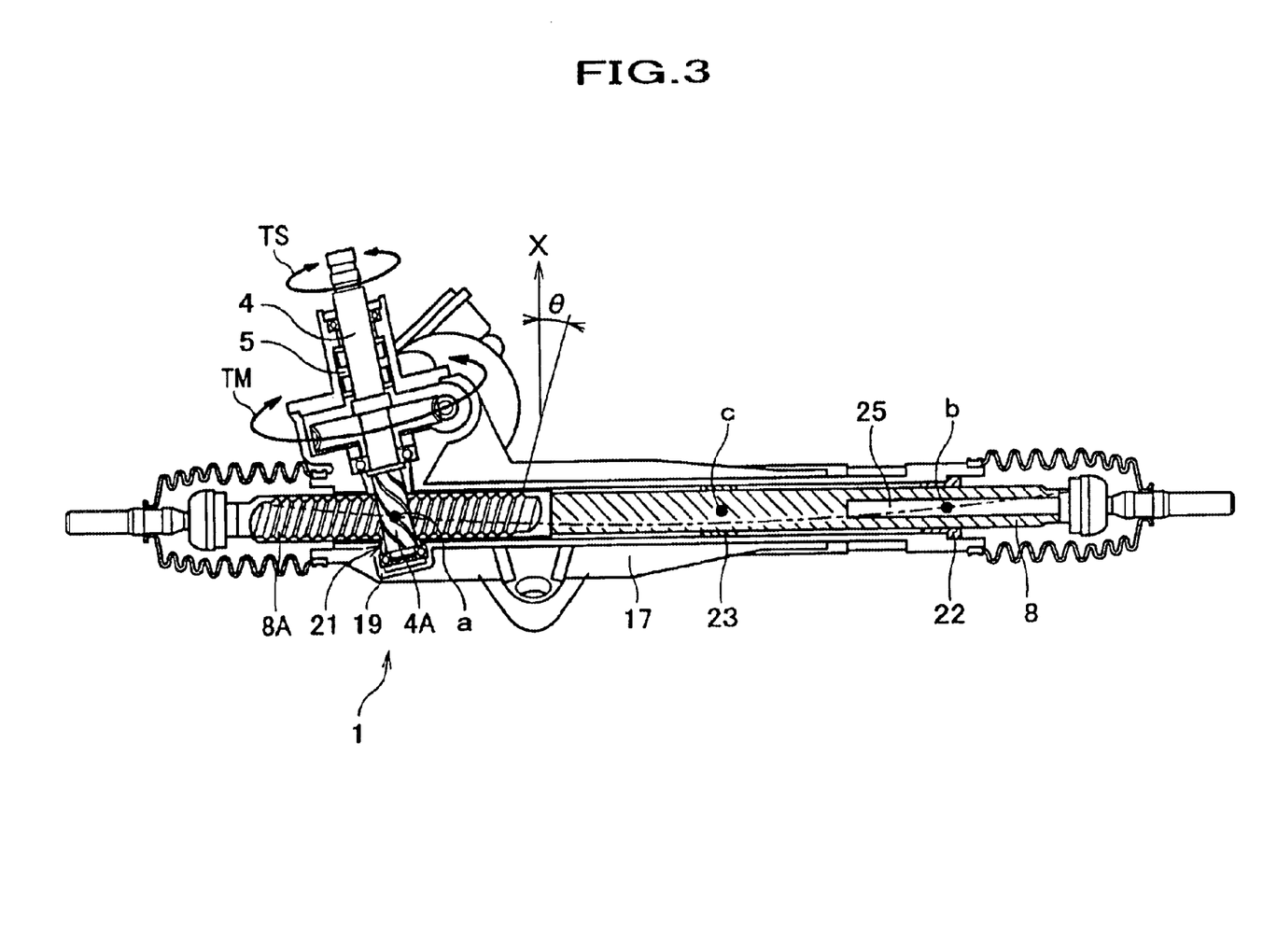
FIG. 3 is a partly sectional view for indicating relationship in a direction of force applied to the rack shaft.

Now, the auxiliary torque supplied from motor 7 is defined by "TM", the steering torque obtained from the driver is defined by "TS" and a pitch circular radius of pinion 4A is defined by "R". Referring to FIG. 3, an unshown force "T" from pinion 4A to rack teeth 8A becomes a magnitude of (TM+TS)/R. Thus; a large transmission force F is applied to rack teeth 8A.

Further, a tooth trace of each of rack teeth 8A is formed, having inclination of tooth trace angle θ relative to direction X perpendicular to the rotating axis of rack shaft 8, resulting in that the force F from pinion 4A to rack teeth 8A also works in a direction of intersection of the rotating axis of rack shaft 8. If the force F is operated in the direction of intersection of the rotating axis of rack shaft 8, it is assumed that rack shaft 8 is supported merely using first supporting member 21 and second supporting member 22, in other words, rack shaft is supported at two fulcrums a, b. In this case, auxiliary torque TM transmitted from motor 7 is substantially five to ten times as large as steering torque TS transmitted using operating steering wheel 2 by the driver, resulting in that rack shaft 8 might bend toward a direction of a drawn two-dot chain line in FIG. 3 by working of transmission force F (=(TM+TS)/R). As above-mentioned, auxiliary torque TM is much larger than steering torque TS. However, by disposal of third supporting member 23 between first supporting member 21 and second supporting member 22, it can be prevented that rack shaft 8 is bent toward a direction drawn by the two-dot line by working of transmission force F (=(TM+TS)/R).

In the aspect of the first embodiment, third supporting member 23 is disposed between first supporting member 21 and second supporting member 22, resulting in that one end portion and the other end portion of rack shaft 8 are supported at fulcrum c other than fulcrums a, b for supporting rack shaft 8 thereby restricting bending of rack shaft 8.

Further, rib 17 for reinforcement in the bending direction is added to rack housing 14.

Thus, when a large torque obtained by applying auxiliary torque TM to steering torque TS works for the mating portion that mates pinion 4A with rack teeth 8A, it can be prevented that abutment between pinion 4A and each of rack teeth 8A occurs resulting in that a force cannot be efficiently transmitted from pinion 4A to rack teeth 8A. As a result, the driver can maintain a splendid steering feeling. Further, abrasion of pinion 4A and/or rack teeth 8A can be reduced. Thus, durability of the electric power steering device can be enhanced.

Further, in the aspect of the first embodiment, rack shaft 8 has hollow portion 25 that is hollowed out and extended from an end surface of rack shaft 8so that the following problem can be overcome using hollow portion 25.

When auxiliary torque TM transmitted from motor,7 is applied to the mating portion of pinion 4A with rack teeth 8A, vibration might occur. Likewise, when a reaction against the road by way of running wheels is transmitted to rack shaft 8, vibration might occur. If a frequency of combination of any of these vibrations is coincident with the characteristic frequency of rack shaft 8, resonance will occur such that rack shaft 8 is greatly vibrated. The vibration of rack shaft 8 is transmitted to steering wheel 2 by way of steering shaft 3 from pinion shaft 4, resulting in that a noise will occur at an interior of the vehicle, and/or a steering feeling of the driver of the vehicle will become worse.

Also, in the aspect of the first embodiment, the characteristic vibration of rack shaft 8 can be decreased by providing hollow portion 25 having a predetermined depth for the rack shaft 8.

By providing hollow portion 25 for rack shaft 8, the entire weight of rack shaft 8 is reduced, resulting in that the characteristic frequency of rack shaft 8 defined by $(K/M)^{1/2}$ (K: spring constant against bending of rack shaft 8, M: mass of rack shaft 8) becomes larger than a characteristic frequency when hollow portion 25 is not formed at rack shaft 8. Thus, it can be adjusted such that the vibration caused by the wheels, motor 7 or the like does not resonate with the characteristic vibration of rack shaft 8, resulting in that a large vibration can be restricted.

Further, vibration transmitted to steering wheel 2 is lessened by way of pinion shaft 4 and steering shaft 3, by such restriction of vibration of rack shaft 8, resulting in that the steering feeling of the driver can be lighter. Also, vibration transmitted to the interior of the vehicle by way of steering wheel 2 is refrained, resulting in that noise in the interior of the vehicle can be restricted.

Further, abrasion of the rack-and-pinion mechanism including rack 8 and pinion shaft 4 and the screw mechanism of the electric power steering device 1 and so on can be lessened, resulting in that the life of device 1 can be extended, by such restriction of vibration of rack shaft 8,.

Additionally, one end portion of rack shaft 8 having rack teeth 8A can be formed as a solid portion that is required for rigidity, while the other end portion of rack shaft 8 having no rack teeth 8A is formed using hollow portion 25 that is not required for rigidity. Accordingly, the rigidity of the entire of rack shaft 8 can remain while the weight of the rack shaft 8 can be reduced thereby adjusting the characteristic frequency of the rack shaft 8, by adjustment of the depth of hollow portion 25 and/or the diameter of section of hollow portion 25.

Therefore, the resonance can be sufficiently adjusted between the characteristic vibration of rack shaft 8 and the vibration of rack shaft 8 caused by the wheels and/or motor 7, by formation of hollow portion 25 at rack shaft 8, even when there is restriction on design to change locations of the supporting members of rack shaft 8 and/or when the adjusting is narrow.

The present invention is not limited to the present embodiment, but various variations and modifications can be made without departing from the scope of the present invention.

Figure 5:
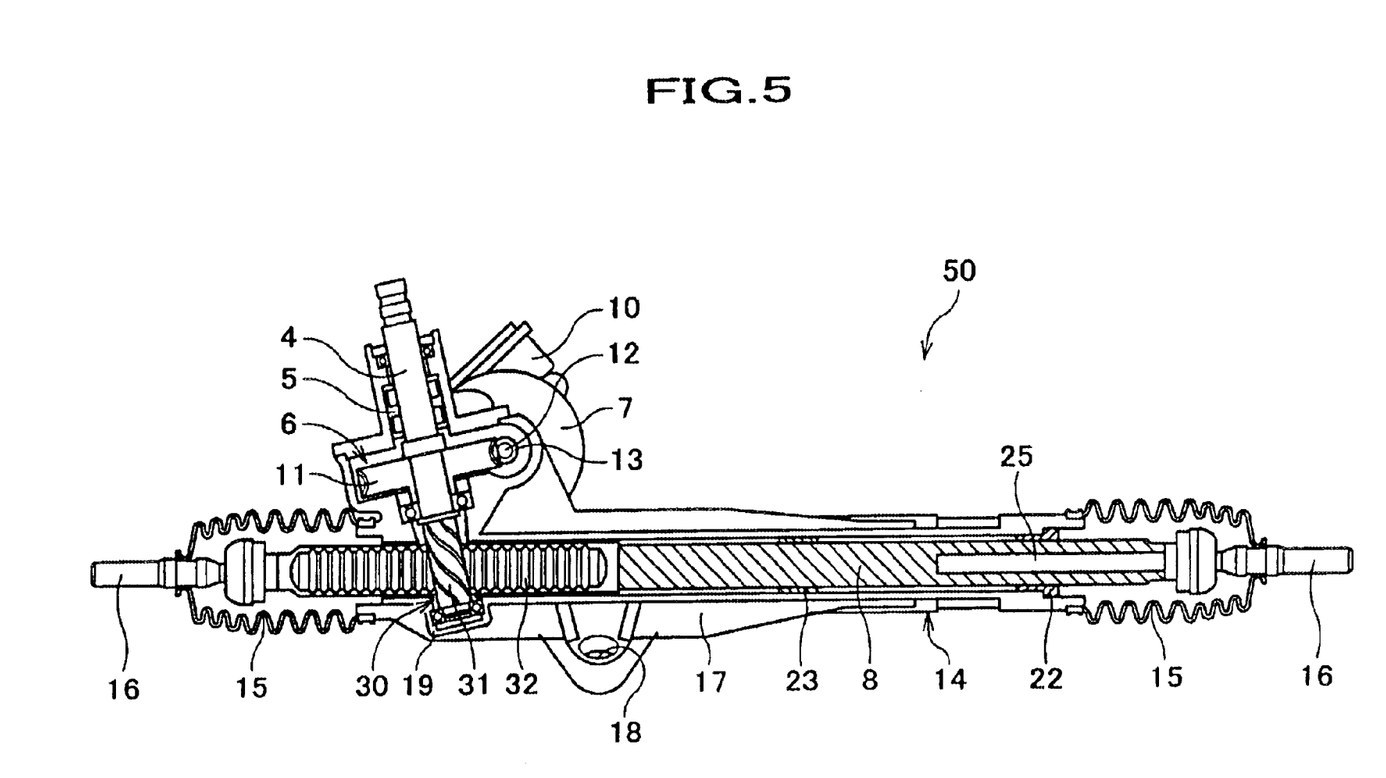
FIG. 5 is an elevation partly in section showing modifications to the first embodiment.

Hereinafter, it will be explained about the configuration of modification of the above-mentioned preferred embodiment. FIG. 5 is an elevation partly in section of the electric power steering device relating to an aspect of the present modification. There are members and units performed in same way as the aspect of the first embodiment. Regarding members and units having the same functions, the same numeral numbers in FIG. 2 are labeled in those of FIG. 5. Details of members and units corresponded to the same numeral numbers are omitted.

As shown in FIG. 5, in comparison with electric power steering device 1 of aspect of the first embodiment, electric power steering device 50 of modification of the first embodiment has a different mating portion of pinion 31 with rack teeth 32. Namely, direction of each of teeth trace of rack teeth 32 is perpendicular to the rotating axis of rack 8. The span of the trace between screws forming rack teeth 32 is somewhat wider, corresponding to rack 32.

Further next, referring to FIG. 5, it will be explained about operations of modification of the first embodiment.

In electric power steering device 50, pinion shaft 4 is rotated by adding auxiliary torque TM by motor 7 to steering torque TS by operation of steering wheel 2 (shown in FIG. 1). Rotation of pinion shaft 4 makes pinion 31 rotate, resulting in that a large torque obtained by applying steering torque TS and auxiliary torque TM to rack teeth 32 mated with pinion 31 can be transmitted.

In this modification, traces of rack teeth 32 are formed normally to a direction of axis of rack shaft 8. The force F transmitted from pinion 31 to rack 8 (called "transmission torque (TS+TM)/R") is added along a direction of rack shaft 8. Therefore, the force F does not work toward a direction where rack shaft 8 is bent, resulting in that bending of rack shaft 8 can be prevented. Thus, even when the large force obtained by applying auxiliary torque TM to steering torque TS is transmitted to pinion 31 and rack teeth 32, the situation can be prevented that a mating defect occurs in a mating portion of pinion 31 with rack teeth 32, so that the force cannot be efficiently transmitted from pinion 31 to rack teeth 32 and a good feeling of steering by the driver can be maintained. Further, abrasion of pinion 31 and/or rack teeth 32 can be reduced, resulting in that durability of the device can be enhanced.

In this modification, rack teeth 32 are formed so that each of traces of rack teeth 32 becomes normal to rack shaft 8. Depending on magnitude (e.g. maximum value) of steering torque TS by the driver of the vehicle and auxiliary torque TM of motor 7, traces of rack teeth 32 can be slightly declined with respective to the rotating axis of rack shaft 8, so that a force working toward the bending direction of rack shaft 8 can be reduced thereby preventing rack shaft 8 from being bent. Namely, depending on magnitude of auxiliary torque TM from motor 7, the traces of rack teeth can be properly set.

Additionally, in the above-mentioned embodiments, it has been explained about electric power steering device 1 that assists the driver by adding the auxiliary torque from motor 7 to the steering torque by the driver. However, another electric power steering device can be employed, which adds a driving force of motor 7 using worm wheel 11 and worm shaft 12 to pinion shaft 4 joined to rack shaft 8 so that wheels 9,9 are steered. For example, the present invention may be also applied to a four-wheel-steering construction vehicle.

What is claimed is:

1. An electric power steering device comprising:
   a pinion shaft to which a steering torque is applied;
   a motor that provides an auxiliary torque for assisting said steering torque;
   a rack shaft having rack-teeth that mate with a pinion formed at said pinion shaft, said rack shaft including a hollow portion;
   wheels provided at both ends of said rack shaft and steered by converting rotation motion of said pinion shaft to displacement motion in a direction of said rack shaft as a result of mating said pinion with said rack-teeth;
   a rack housing for said rack shaft;
   a first supporting member that supports one end of said rack shaft, said first supporting member being said rack-teeth provided at said one end of said rack shaft, said pinion provided at said pinion shaft mating with said rack-teeth to support said rack shaft;
   a second supporting member that supports the other end of said rack shaft; and
   a third supporting member that slideably supports a portion between said one end and said the other end with respect to said rack housing.

2. An electric power steering device according to claim 1, wherein said rack shaft includes said hollow portion formed at the other end of said rack shaft which is opposed to said one end in which said rack-teeth are formed.

3. An electric power steering device according to claim 1, wherein said rack shaft includes said hollow portion extended from an end surface of said rack shaft in a direction of axis of said rack shaft.

4. An electric power steering device according to claim 1, wherein said rack shaft includes said hollow portion formed in a hollow-cylindrical shape and extended from an end surface of said rack shaft in a direction of axis of said rack shaft.

5. An electric power steering device according to claim 4, wherein a bottom of the hollow portion of said rack shaft is formed in a substantially hollow-conical shape.

6. An electric power steering device according to claim 4, wherein a bottom of the hollow portion of said rack shaft is formed in a substantially semi-spherical shape.

7. An electric power steering device according to claim 1, wherein said second supporting member is a bearing which provides slideable support for said rack shaft relative to said rack housing.

8. An electric power steering device according to claim 1, wherein said rack housing includes a rib extending in a bending direction of said rack housing.

9. An electric power steering device comprising:
   a pinion shaft to which a steering torque is applied;
   a motor that provides an auxiliary torque for assistance of said steering torque;
   a rack shaft having rack-teeth that mate with a pinion formed at said pinion shaft, said rack shaft including a hollow portion, said hollow portion having a diameter which is gradually smaller from an end surface of said rack shaft in a direction of axis of said rack shaft to the other end surface;
   wheels provided at both ends of said rack shaft and steered by converting rotation motion of said pinion shaft to displacement motion in a direction of said rack shaft as a result of mating said pinion with said rack-teeth;

a first supporting member that supports one end of said rack shaft and that is formed by mating said rack-teeth provided at said one end with said pinion provided at said pinion shaft;

a second supporting member that supports the other end of said rack shaft; and a third supporting member that supports a portion between said one end and said the other end.

* * * * *